US009727834B2

(12) United States Patent
Reyes

(10) Patent No.: US 9,727,834 B2
(45) Date of Patent: Aug. 8, 2017

(54) REMOTE MEASUREMENT VIA ON-SITE PORTABLE PLATFORM

(76) Inventor: Jerome Reyes, Stanwood, WA (US)

( * ) Notice: Subject to any disclaimer, the term of this patent is extended or adjusted under 35 U.S.C. 154(b) by 0 days.

(21) Appl. No.: 13/492,800

(22) Filed: Jun. 8, 2012

(65) Prior Publication Data

US 2012/0316913 A1  Dec. 13, 2012

Related U.S. Application Data

(60) Provisional application No. 61/494,690, filed on Jun. 8, 2011.

(51) Int. Cl.
G06Q 10/00 (2012.01)
G06Q 10/06 (2012.01)
G06Q 50/08 (2012.01)

(52) U.S. Cl.
CPC ......... *G06Q 10/0635* (2013.01); *G06Q 50/08* (2013.01)

(58) Field of Classification Search
USPC .............................................. 705/7.11–7.42
See application file for complete search history.

(56) References Cited

U.S. PATENT DOCUMENTS

| | | | |
|---|---|---|---|
| 7,487,114 B2 * | 2/2009 | Florance et al. | 705/27.2 |
| 8,078,436 B2 | 12/2011 | Pershing et al. | |
| 8,145,578 B2 | 3/2012 | Pershing et al. | |
| 8,170,840 B2 | 5/2012 | Pershing | |
| 2004/0083136 A1 * | 4/2004 | Sasser | 705/26 |
| 2008/0262789 A1 * | 10/2008 | Pershing et al. | 702/156 |
| 2009/0265193 A1 * | 10/2009 | Collins et al. | 705/4 |
| 2010/0110074 A1 * | 5/2010 | Pershing | 345/423 |

OTHER PUBLICATIONS

Parker, et al., "A portable LIDAR system for rapid determination of forest canopy structure", Journal of Applied Ecology, 2004, 41, pp. 755-767.*

* cited by examiner

*Primary Examiner* — Amber A Misiaszek
(74) *Attorney, Agent, or Firm* — Boswell IP Law; J. Mason Boswell

(57) ABSTRACT

A portable measurement system is described herein that provides accurate real-time data for a subject object at a job site. The acquired data may include photos, laser mapping, thermal images, sonar imaging, electronic measurements, or other types of measurement data. The system leverages commonly available remote control helicopters or other flying vehicles mounted with a camera or other equipment to acquire images or other measurement data that would be difficult to obtain without climbing onto a target structure or placing personnel in other dangerous situations. A portable platform is described herein that can include helicopters as well as other types of portable measurement devices that can fly or otherwise maneuver to capture measurement data at a job site. In many cases, these connected devices can provide near instant availability of captured data to a processing center or other remote location, reducing delays that are typical today.

20 Claims, 4 Drawing Sheets

REMOTE MEASUREMENT VIA ON-SITE PORTABLE PLATFORM

CROSS-REFERENCE TO RELATED APPLICATIONS

The present application claims the benefit of U.S. Provisional Patent Application No. 61/494,690 entitled "REMOTE MEASUREMENT VIA AERIAL PLATFORM", and filed on Jun. 8, 2011, which is hereby incorporated by reference.

BACKGROUND

Measurements are obtained for a variety of types of purposes, including by contractors bidding on construction work. One area where measurements are useful for determining job costs is in the field of roofing. Currently, measurements are obtained by placing personnel on the roof to manually walk the roof and take measurements. These measurements are later used to draw the roof based off notes, or provided to a paid service to draw the roof.

Another type of measurement is produced without a site visit by using aerial satellite or fly-over imagery of an area that is publicly available from several providers (e.g., Google Earth, Microsoft Virtual Earth, and so forth). This type of measurement has several drawbacks. First, the imagery is taken from so far away from the target job site, that it often lacks sufficient resolution to allow proper estimation of job costs. In addition, because the imagery is taken from far overhead, only a top down perspective of the target site is available. Features that might be visible from a side perspective are not capture by such methods. For example, roof penetrations like vents, chimneys, and the like may not be clearly visible or easily measurable from low resolution, overhead imagery. Finally, such imagery is rarely updated, and often only contains pictures of a job site as it existed prior to any damage. For example, if the reason for needing construction work is due to damage from a hailstorm, insurance adjusters and contractors alike may be interested in seeing the damage to the site.

The current methods do not give sufficient documentation or accuracy as additions to the roof or other job site may have been made since a photo was last taken. The aerial method does not identify current damage and the level of accuracy is insufficient and inconsistent, often leading to estimation errors. Existing photos are of such poor resolution that many features of a roof (e.g., plumbing vents) cannot be seen or accurately measured. Oftentimes the existing database of photos does not offer coverage in rural areas or are sometimes obscured by foliage or shadowing. For on-site methods that involve the placement of personnel in danger, contractors and insurance adjustors take risk getting on damaged roofs in order to document the roof and acquire measurements for repairs and replacements of roofs. The existing process is dangerous, time consuming, and often inaccurate.

DETAILED DESCRIPTION

Figure 1:
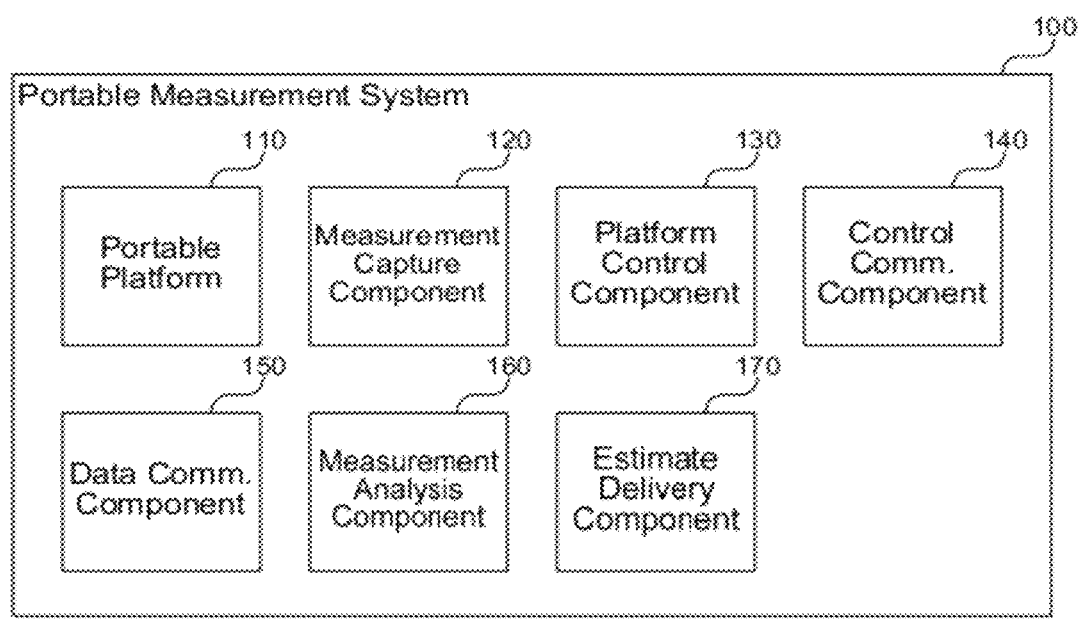
FIG. 1 is a block diagram that illustrates components of the portable measurement system, in one embodiment.

A portable measurement system is described herein that provides extremely accurate real-time data for a roof or other object at a job site, without placing personnel in danger. The acquired data may include photos, laser mapping, thermal images, sonar imaging, electronic measurements, or other types of measurement data. In some embodiments, the system leverages commonly available remote control helicopters or other flying vehicles mounted with a camera or other equipment to acquire images or other measurement data that would be difficult to obtain without climbing onto a target structure or placing personnel in other dangerous situations. In recent years, several self-stabilizing remote control helicopters (e.g., quadcopters) and helicopter kits have become cheaply available, and some even offer control via a smartphone using Bluetooth, Wi-Fi, or other remote connections. An aerial platform is described herein that can include such helicopters, as well as other types of portable measurement devices, such as laser measurers, remote cameras, and so forth that can fly or otherwise maneuver to capture measurement data at a job site. In many cases, these connected devices can provide near instant availability of captured data to a processing center or other remote location, reducing delays that are typical today. The devices may also capture data locally to a storage unit on the device and then allow later uploading or syncing of captured measurement data to a computer system or other processing facility. Thus, the portable measurement system provides a portable remote measurement platform that can be taken to a potential job site and used safely to capture measurement data that is accurate, timely, and useful for producing estimates for work to be performed.

The portable measurement system can be used to provide a consumer or other user the ability to safely view and measure a wide variety of building exterior components such as roofs, gutters, siding, windows, fencing, landscaping, and parking lots. The system can also be used in other industries such as farming, security, fishing, hunting, military, law enforcement, firefighting, and large incidents (such as natural disasters). Systems of measurement, estimating, evaluating, and reconnoitering can leverage the portable measurement system. Real estate evaluation, advertising, city planning, and building department enforcement, as well as fish and wildlife department inspections departments can benefit from the system as well as lifeguarding, railroad safety, and construction project management.

The portable measurement system provides near instantaneous data to the end user, provides documentation, and provides aerial perspective at a much lower cost to the end user than what is currently available. The following paragraphs describe phases of operation of the system for acquiring measurement data using the portable measurement system. The phases include preparation, link, flight, data transfer, processing, and product delivery, each described in detail below.

The preparation phase includes the acquisition of information by the end user (e.g., a contractor, homeowner, insurance adjustor, or roof consultant) to determine whether or not conditions (e.g., rain, wind, hail, etc. . . . ) are within the operation parameters of the portable platform and whether there is sufficient space for a safe takeoff and landing (for aerial platforms) or other maneuvers. In some embodiments, the portable platform includes any remote controlled aircraft capable of carrying a payload of a digital camera or other sensors and stable hovering flight.

The link phase includes the action of acquiring a connection between the aerial platform, the operator, and/or a centralized base location where acquired data can be processed (or any combination of the three). This phase may be performed through any facility for transmitting information known in the art, such as through a verbal signal (e.g., speaking through a Bluetooth headset to a Bluetooth receiver in the platform), a written signal (e.g., a letter), an electronic signal (e.g., email), a visual signal (e.g., video monitor), and so on. The link allows for the transfer of data and may be used to remotely control the flight of the portable platform by providing parameters and waypoints for images to be taken. For example, in one embodiment an operator may point a laser sight at significant points of a roof, registering each point with software running on a mobile phone as a point of interest for a photograph or other capture of measurement data. The software may develop a flight plan automatically and direct the portable platform to the registered points, or may allow the operator to fly the platform manually to the points.

The link may include various types of connections, such as a Wi-Fi connection between the aerial platform and a control device (e.g., a remote or smartphone) carried by the operator, a 3G connection between the control device and a base station, and so on. Those of ordinary skill in the art will recognize a wide variety of available types of connections for sharing data and commands between the operator, portable platform, and base station.

Flight describes the operation of the portable platform from takeoff to landing (or other maneuvers) and the acquisition of photos and other data at specified locations. In some embodiments, the system automatically selects an altitude of the portable platform at which photos taken will show the entirety of the subject (e.g., a roof), but from as close as possible to capture the most detail possible (e.g., less than 500 feet above ground level). In some jurisdictions, regulatory rules may limit the maneuvering of the portable platform, and the control software can be configured to adhere to such rules. The Federal Aviation Administration (FAA) has discussed rules called "detect, sense, avoid" (DSA) for vehicles over 4 lbs. and 400 feet of flight altitude. The system can be programmed to adhere to such rules by keeping flight under an altitude threshold or other steps. The maneuvers can be manually controlled by the end user, remotely controlled by a base, automatically controlled by software with pre-programmed global position system (GPS) waypoints, or a hybrid of any combination of these or other methods.

In some embodiments, the portable platform may include sensors that automate part or all of the maneuvers. For example, the platform may include sensors for avoiding obstacles, sensors for identifying and positioning around the subject, sensors for determining how large the subject is and where to position the platform, and so forth. Robotics and object recognition have improved to the point that it is possible through software and input (such as from cameras, microphones, infrared sensors, and so on) to automate maneuvers around a subject and rapidly capture information at specified waypoints.

Data Transfer describes the ongoing transfer of data between any parts of the system, such as the portable platform, an operator controller, and a base station (e.g., datacenter or separate onsite device). The software that links the portable platform and base can be used to control the maneuvers, transfer photos acquired before, during, and after the maneuvers as well as information deemed pertinent by the end user and base.

The system can be implemented in a variety of ways. In some embodiments, an operator goes to a site with the portable platform. During the site visit, the operator communicates with the portable platform via a controller, which can include a device already carried by the operator, such as a smartphone, with a custom software application that is part of the system. Upon leaving the site and returning to the operator's office or other location, the operator can dock the portable platform or controller to upload the captured measurement data.

In other embodiments, the portable platform and/or operator controller communicate with a central processing center remotely while in the field. This allows the information to be provided to the processing center much faster and allows feedback to the operator while still at the job site. For example, an analyst at the processing center may determine that further images would be helpful, and may send a message to the operator requesting additional images (or other data) or the analyst may direct the portable platform to capture the data himself.

Processing describes the manipulation of the data either manually by a person or automatically with software (or a combination thereof) to provide the desired product to the end user. In some embodiments, the system uses photos and measurements captured by the portable platform along with diagramming software to accurately measure and report the total linear measurements of roof or other subject features. The diagramming software may include methods for determining the pitch of a roof in a photo so that the software can identify and measure ridges, rakes, valleys, hips, gutters, and area measurements of different fields of a roof and the totals of all measurements along with pitches and roof penetrations including but not limited to skylights, chimneys, plumbing ventilation, and solar panels. Automated processing of this type can be completed rapidly upon receipt of the input data from the portable platform in the field.

The processing phase may include various levels of human and machine interaction. For example, software may provide initial measurement output that an analyst then verifies and either approves or modifies before approving. For example, the analyst may check whether the software correctly identified each of the roof features. In some embodiments, the system automatically tunes itself based on analyst feedback to improve subsequent automatic recognition of features and related measurements.

Product delivery describes the delivery of a product to the end user, such as a report, contract bid, or other output from the system. In some embodiments, the portable measurement system includes a website through which users interact with the system to place an order and receive output in response to the order. For example, a user may visit the website and provide an address of a location of the user's home that needs a roof, as well as other information such as contact information, scheduling information, and so forth. The system dispatches an operator with a portable platform to the user's location, where the operator uses the portable platform to capture data about the user's roof without climbing up on the roof himself. The portable platform uploads information to a processing center, which analyzes the captured information to create a model of the work to be performed. Bidding software then creates a bid based on the model, and provides the bid as output to the user. The system may send the user an email, text message, or other notification when the output is available. The entire process can be completed in a matter of days or even hours, helping users, contractors, and others obtain fast access to detailed information for accomplishing their goals.

The system provides an end-to-end solution that can reduce the number of parties involved producing an estimate and the time involved due to reduced handoffs between parties. The system may also include a database of regional materials costs, labor costs, taxes, and other regional differences that can be consulted by the system to produce estimates for any particular location that are accurate and specific for that location. The system can provide a cradle to grave solution from incoming photos or other data to an output estimate. The system can eliminate many current instances where paperwork, manual data entry, and other actions of the operator are involved. The photos and other data captured can show causation and other requirements of industries like insurance.

The phases described above may occur in the order described or may be reordered in some implementations to achieve similar results. For example, the link phase may occur before the preparation phase, and the data transfer phase may occur at several stages of the process (e.g., initially to dispatch the operator, in the middle to capture flight data, and later to send output information to the user).

FIG. 1 is a block diagram that illustrates components of the portable measurement system, in one embodiment. The system 100 includes a portable platform 110, a measurement capture component 120, a platform control component 130, a control communication component 140, a data communication component 150, a measurement analysis component 160, and an estimate delivery component 170. Each of these components is described in further detail herein.

The portable platform 110 is a physical device that is delivered on-site to a potential job site and automatically maneuvers around the job site to capture measurement data for estimating a cost of a task to be performed at the job site. In some embodiments, the portable platform is a remote controlled quadcopters or other flying device that includes sensors for capturing data. Both the flight mechanics and sensors may include a variety of types of common or custom-made parts. For example, the flight mechanics may include controlled flyers, hot air balloons, long poles, helicopters, gliders, unmanned aerial vehicles (UAVs), or any other type of remotely controllable vehicle. The device may be equipped with a variety of sensors for capturing useful measurement data, including digital photos, laser mapping and/or measurements, thermal images, sonar mapping, and so on. Other components described herein may be mounted on the portable platform 110 (e.g., the measurement capture component 120) or may be part of a base unit held or placed near the operator of the portable platform 110 (such as the platform control component 130). Some components may have separate sub components located both on and off the portable platform 110. For example, the platform control component 130 may include a software application running on a computing device held by the operator as well as hardware on the portable platform for converting received data signals (e.g., via a Wi-Fi connection) into vehicle control signals (e.g., accelerating, turning, yaw/pitch/roll, and so on).

In some embodiments, the portable platform 110 itself contains software for analyzing captured data and calculating estimate data from the captured measurement data. The portable platform 110 may provide the ability to output information, such as a three-dimensional model or other visualization, to a nearby device (e.g., a monitor or printer). In such cases, the system 100 may operate without a central processing facility or the facility may provide a different role (e.g., billing, capturing customer data, and so forth) and be less involved with data capture and processing.

In some embodiments, the portable platform 110 provides first person viewing (FPV) of the flight or other maneuvers by the operator with a video monitor, glasses, a smartphone display, or other viewing device. The platform 110 may also include a "return to home" function as a safety measure in case a need arises to take control of the portable platform 110 locally and have the vehicle immediately return to the spot it was launched. Power sources for the portable platform 110 may include battery, solar, wired, or laser powered flight. A laser can be used to control the movement of flight as well as photograph functions.

In some embodiments, the portable platform 110 operates independently and includes an information output device (such as a monitor or display), an information input device (such as a mouse, keyboard, touchpad, or microphone), and the mechanical means to fly autonomously. This device includes sufficient computing power to capture aerial photos, perform edge detection, and create a model of the structure with scaled measurements for pertinent features. The platform 110 may then send this information via email or other communication mechanism to the end user or other parties.

The measurement capture component 120 includes one or more sensors attached to the portable platform 110 for capturing measurement data at the job site. The sensors may include a camera for capturing images and/or video, an infrared camera for capturing heat patterns, a laser measurement device for determining distances, a sonar device for capturing distances, or any other type of measurement device that can be carried by the portable platform 110. The measurement capture component 120 may include a storage device located on the portable platform 110 for storing captured measurement data. Alternatively or additionally, the measurement capture component 120 may invoke the data communication component 150 to transmit captured data in real time to another device, such as the controller held by the operator or a remote server that processes the captured measurement data.

The platform control component 130 may include controls for turning on and off the various sensors that make up the measurement capture component 120, or the measurement capture component 120 may operate autonomously according to preprogrammed measurement capture patterns. In some embodiments, it is desirable to make operation of the portable platform 110 simple so that untrained personnel can carry the portable platform 110 to a job site and capture useful data without understanding the specifics of how the portable platform 110 operates. In other embodiments, a skilled operator may want to have finer grained control over the data captured by the system 100, and thus the system may either include an advanced override or separate embodiments that are provided to each target user type of the system 100.

The platform control component 130 controls the operation of the portable platform 110 to direct the portable platform through a particular navigation path and the operation of the measurement capture component to capture measurement data. The platform control component 130 may include a variety of control technologies. For example, the component 130 may include automated control software, such that very little external input is received after programming an initial navigation plan (such as a flight plan of a helicopter), or the component 130 may include a separate physical controller for manually or automatically controlling the platform. The controller may include a dedicated remote control, a smartphone running control software and connected via a communication link, and so forth. For example, an operator may use an APPLE™ IPHONE™ or GOOGLE™ ANDROID™ application to program a flight pattern using global positioning system coordinates as waypoints at which the portable platform 110 will acquire data that the application may automatically transfer to a base service for processing. The controller, portable platform, and base service may communicate using wired or wireless communication (e.g., Bluetooth technology, infrared signals, radio signals, laser signals, 3G, 4G, or any other wired or wireless means of communication).

In embodiments in which the platform control component 130 includes a separate physical controller, the controller may include automated software or other instructions that the controller communicates to the portable platform 110 with little or no intervention from the operator. For example, the system 100 may include downloadable flight patterns or other control schemes that an operator can store on the controller so that the operator does not have to understand how to fly or maneuver the portable platform 110. The controller may also allow manual control, so that a skilled operator can communicate advanced control patterns to the portable platform 110 directly by using the controller. In still other embodiments, the controller may be located at a separate location, such that an operator in a command center may direct the flight or other maneuvers of the vehicle. In such cases, an on-site operator may be responsible for delivering the portable platform 110 to the job site, while a remote operator handles the flying and/or measurement data capture.

The control communication component 140 includes hardware and software for establishing a link between the portable platform 110 and platform control component 130 and subsequently communicating control instructions. The control communication component 140 may use commonly available communication standards, such as Wi-Fi, Bluetooth, 3G/4G/LTE, radio frequency control, and the like, or may use proprietary communication protocols developed for the system 100. The component 140 provides the ability for the platform control component 130 to send instructions to the portable platform 110 and in some cases to receive acknowledgement from the portable platform 110 of the receipt of the instructions.

The data communication component 150 includes hardware and software for establishing a link between the measurement capture component 120 and the measurement analysis component 160. The control communication component 140 and data communication component 150 may use the same hardware and/or software or may use different communication protocols. For example, the control communication component 140 may communicate at short range using Wi-Fi signals while the data communication component uses cellular protocols (e.g., 3G, 4G, or LTE) to communicate longer range, such as to a remote data center via the Internet. Data communication may include communicating data from the portable platform 110 to a device carried by the operator at the job site (e.g., a smartphone, controller, or other device) as well as communicating data from the portable platform 110 to a remote service (such as a central estimation service or other facility for analyzing the captured data).

The system 100 may provide the operator with a live connection with the base during and after the flight to confirm receipt of data (e.g., a phone connection, instant messaging, or similar), or may work offline to allow the operator to capture data in rural or other less connected areas, and then later upload the data when a connection is available.

The measurement analysis component 160 processes measurement data captured at the job site to identify elements in the data that affect pricing of the task to be performed. For example, the component 160, when used for roof estimation, may identify pipes, gutters, or other objects that affect the roof profile as well as geometric characteristics of the roof such as each section's length, width, pitch, and so forth. The measurement analysis component 160 may use any combination of proprietary and off-the-shelf estimation software to perform its function. For example, software exists today for calculating roof dimensions from a set of input measurements, and can be leveraged by the system 100 to perform part of the estimation described herein.

In some embodiments, the portable platform 110 and measurement analysis component 160 may be run by separate entities (e.g., an operator and processing center). For example, the processing center may contract with one or more operators to be available for dispatch to locations, and the operator may maintain expertise in capturing measurement data using the portable platform 110 and providing the information to the processing center. In some cases, the processing center may provide a measurement kit to a homeowner or other end user that the end user can request for remotely capturing and uploading data to the processing center. In other cases, a roofing contractor or similar subject matter expert may use the system 100 to take on-site to potential job sites and may contract with the processing center to provide automated processing of captured information to determine measurements and other information from which the expert can generate a bid.

The estimate delivery component 170 generates an estimate for the task to be performed at the job site from the measurement analysis and delivers the estimate to a user of the system. The user may be the operator, a contractor, a homeowner, or another party that requests to receive the estimate. The estimate is the end result of the data capture and analysis of the system 100 and incorporates features of the job site discovered using the portable platform 110, such as a current condition of the job site, profile and other views not captured by traditional aerial/satellite imagery, and other conditions. In this way, the system 100 produces estimates that are more accurate and comprehensive than previous estimation systems.

A software application run by the operator during the control of the portable platform 110 may identify the specific operator requesting control of the platform 110 and may access and preload information such as the operator's contact and billing information as well as email address for estimate delivery. In some cases, the system 100 uses GPS or other location hardware to detect a location where the portable platform 110 is being used, and uses the location information to associate additional information with the captured measurement data and resulting estimate, such as a job site address, customer name, and so forth.

In some cases, the entire process of arriving at a job site, maneuvering the portable platform 110 to capture data, analyzing the data, and generating an estimate may happen very quickly (e.g., in a matter of minutes), compared to the days or weeks that past estimates of this type might take. Thus, the system 100 saves homeowners, operators, contractors, insurers, and other interested parties time and brings repairs and other issues to a faster resolution than was previously possible.

The computing and other devices on which the portable measurement system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
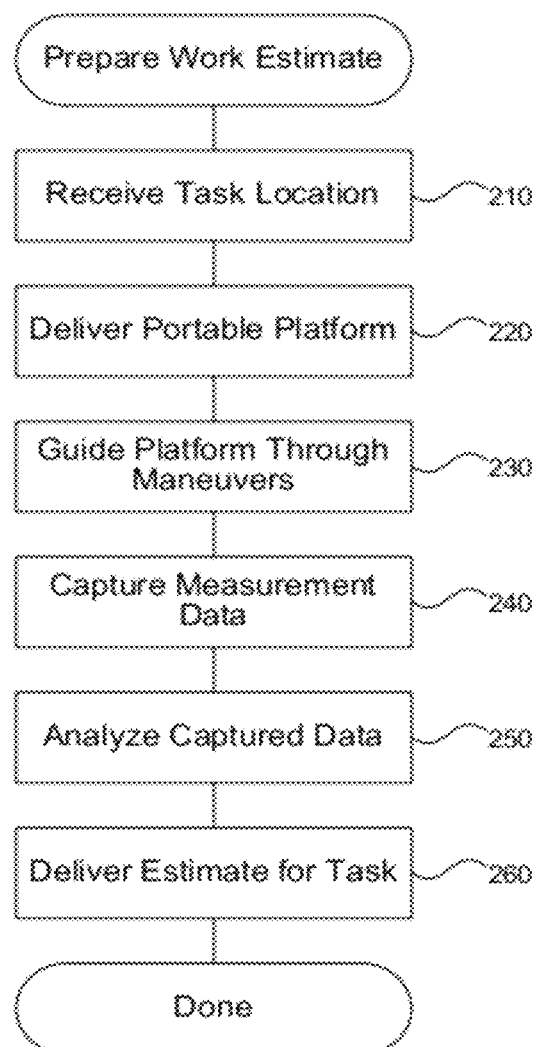
FIG. 2 is a flow diagram that illustrates processing of the portable measurement system to prepare a work estimate, in one embodiment.

FIG. 2 is a flow diagram that illustrates processing of the portable measurement system to prepare a work estimate, in one embodiment.

Beginning in block 210, the system receives a request to prepare an estimate for a particular construction task at a specified location. For example, the system may maintain a website on the Internet through which homeowners, contractors, insurers, or others can submit orders for estimates for particular types of work. The request may include a street address, client name, or other identification of the proposed job site so that an operator can be dispatched to the location to use the portable platform to capture measurement data. In some embodiments, the system may receive requests from traditional methods such as phone calls or emails that are later entered into the system by a user of the system.

Continuing in block 220, the system dispatches an instance of a portable platform that is a remote controlled vehicle capable of maneuvering around the specified location to capture measurement data for preparing the requested estimate. The system may deliver the vehicle by preparing shipping information for a worker to ship the portable platform to a homeowner, or may send an instruction (e.g., via email, instant message, or other communication) to an operator to personally take the portable platform to the specified location. In embodiments in which the portable platform is capable of operating autonomously, the system can ship the platform to the homeowner to be shipped back once data capture is complete. The system may also include a retail outlet or other location where the homeowner can pick up and return the platform, potentially placing a deposit on hold for security of the value of the platform.

Continuing in block 230, the system controls the portable platform through maneuvers at the received location. The maneuvers may include a flight path or other navigation path that carries the vehicle to points around the specified location where one or more sensors of the portable platform can capture data related to preparing the requested estimate. For example, for a roof the maneuvers may include vertical lift to the height of the roof followed by a flight pattern around the outer perimeter of the roof that allows capture of images and other data from all sides of the roof. The control of the portable platform may occur through a controller operated by an operator, such as a dedicated controller carried by the operator, or a smartphone or other computing device running an application that communicates using Wi-Fi or other communications technology with the portable platform. In other embodiments, control of the portable platform may occur automatically, using a preset flight plan or sensor-based navigation on the vehicle itself. In some cases, the platform may alternatively be remotely controlled by an operator in a remote datacenter connected to the portable platform via the Internet, a cellular network, or other network.

Continuing in block 240, the system captures measurement data at the specified location using one or more sensors mounted to the portable platform. The measurement data may include photos (that can later be analyzed to determine locations of obstructions, relative sizes of objects, and so on), distance measurements (e.g., using laser, sonar, or other measurement devices), angular measurements, and so forth. The portable platform captures measurement data from a perspective that would be difficult or impossible from the ground, and keeps the operator and homeowner safe by traveling to perspectives of the job site that would normally be unavailable without the operator getting on a ladder, roof, or other hazardous location. The system captures measurement data that is more accurate, specific, and high resolution than that available from satellite imagery or high altitude flyovers of the job site. Because the portable platform is at the job site, the portable platform can capture detailed information about that site, including profile perspectives and others that are difficult or impossible from a vantage point far overhead. For example, a satellite cannot look at the side of a roof facing from the front or rear of a house, or up at the roof from the ground.

Continuing in block 250, the system analyzes the captured data to process the captured measurement data into information actionable for preparing an estimate for the particular construction task at the specified location. The system may include an additional step (not shown) of transferring data from the portable platform and/or control device carried by the operator to a central processing facility, such as a server or cloud-based service connected via the Internet. The portable platform may upload measurement data as it is captured or may undergo a syncing process later (e.g., when the operator returns to the office) during which data is transferred from the platform for processing and analysis.

The analysis may include various types of processing of the captured data, such as image recognition to identify objects in captured photos, identification of obstructions or other difficulties that may increase the cost of the construction task, determining angle, distance, or other measurements, determining an extent of identified damage, and so forth. In some cases, the system may take a physical measurement at the property, such as the length of a roofline, and then use photos or other captured data to determine relative measurements based on the captured physical measurement of other objects. For example, if the width of the roof is known, then the height that appears half as high in a photo can be inferred to be half the known width. The system may also construct a two-dimensional or three-dimensional model of the captured data to allow import of the captured data into computer-aided design (CAD) or other computer programs for generating the requested estimate.

Continuing in block 260, the system generates an estimate for the construction task at the specified location and delivers the estimate to a user of the system. The estimate may include an estimate of time needed to complete the task, cost of materials of the task, cost of labor of the task, needed permits or other special conditions, and so forth. The delivery of the estimate may occur through a website, email, postal mail, or other delivery to the user. In some cases, the system may provide the estimate to a contractor as well as to a homeowner. The system may also provide different views of the estimate to different parties. For example, a contractor may receive a view that includes wholesale materials pricing and detailed labor information, while a homeowner may receive a job total with applicable taxes. The system may also consider regional factors in the estimate, such as times of year when particular work can be performed due to seasons, local tax rates, local materials and/or labor costs, and so forth. After block 260, these steps conclude.

Figure 3:
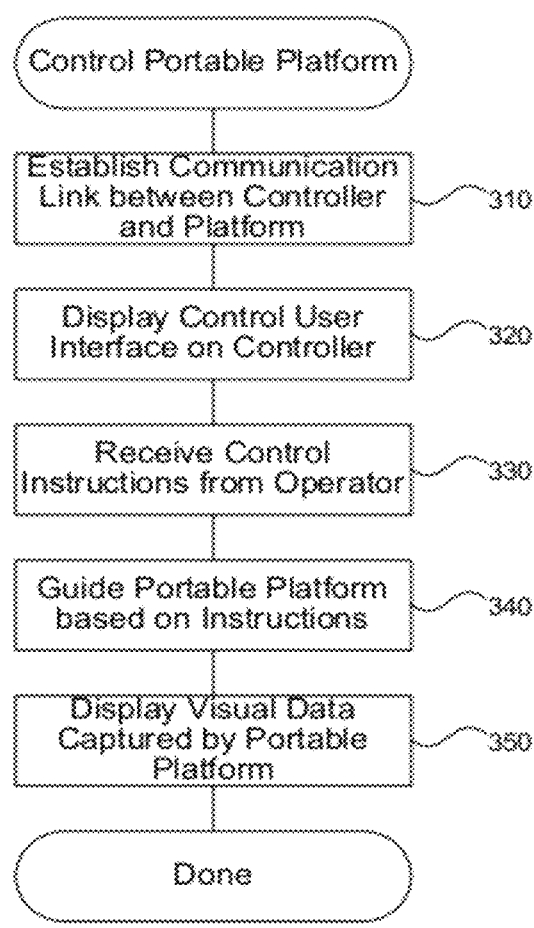
FIG. 3 is a flow diagram that illustrates processing of the portable measurement system to receive control information for a portable flying platform from a mobile device, in one embodiment.

FIG. 3 is a flow diagram that illustrates processing of the portable measurement system to receive control information for a portable flying platform from a mobile device, in one embodiment.

Beginning in block 310, the system establishes a communication link between the portable flying platform and the mobile device. The link may be established using Wi-Fi, Bluetooth, 3G/4G, laser transmission, or any other communication technology. In some embodiments, the platform and mobile device may undergo a pairing process that uniquely identifies each to each other so that multiple instances of the platform being controlled in the same area do not interfere with each other. The system may also provide security that restricts which mobile device can control which mobile platform.

Continuing in block 320, the system displays a control user interface on the mobile device that includes flight controls for the portable flying platform. The mobile device may include a smartphone or other computing device that runs a software application selected by the operator for controlling the portable flying platform. The controls may include standard aviation controls (e.g., stick, rudder, and so forth) or other controls such as simplified controls for non-pilots, such as axis-based controls like up/down/left/right/forward/back. The system may also include one or more predefined flight patterns, such as "elevate 100 feet and circle the structure" from which the operator can select using the user interface.

Continuing in block 330, the system receives control instructions from a user that interacts with the mobile device to control the portable flying platform to capture measurement data at a potential job site. The control instructions allow the user to direct the portable flying platform to various locations around the job site where measurement data can be captured from various perspectives. For example, for a roof the control instructions may direct the portable flying platform around the outer edges of the roof, overhead, and slightly below the roof to capture data from a profile view, overhead view, and view looking up, respectively. The user may provide control instructions by tapping virtual, on-screen buttons on a touch interface, operating a physical button (e.g., directional pad) on the mobile device, speaking, or other input to the mobile device (e.g., tilting the device to provide input to a gyroscope or accelerometer).

Continuing in block 340, the system guides the portable flying platform based on the received control instructions. The portable platform may include hardware for receiving communications via the established link and converting the instructions to signals for actuating relays, motors, or other physical devices of the portable platform. For example, an instruction to elevate the platform may result in hardware on the platform providing more voltage to one or more propeller motors on a helicopter-based portable flying platform, while an instruction to turn may actuate a rudder or change the relative speed of a propeller of a multiple-propeller vehicle. The platform and/or mobile device may also include pre-defined flight patterns and the control information may specify and invoke one of the pre-defined flight patterns.

Continuing in block 350, the system receives visual data captured by the portable platform and displays the captured visual data on the mobile device during operation of the mobile device to receive control information. The visual data provides feedback to the operator so that the operator can see what the portable flying platform sees, and can avoid obstacles, maneuver the platform to capture additional data, and so forth. After block 350, these steps conclude.

Figure 4:
FIG. 4 is a display diagram produced by the portable measurement system that illustrates a control and data display, in one embodiment.

FIG. 4 is a display diagram produced by the portable measurement system that illustrates a control and data display, in one embodiment. The display is produced by a quadcopters flying above a roof at 125 feet. The display 410 illustrates an image of a home's roof captured from a camera on-board the portable platform described herein. An elevation control 420 allows an operator to guide the platform higher or lower with a slider control. A text display 430 displays the approximate current elevation of the portable platform. A touchable perspective control 440 allows the operator to guide the vehicle and or camera left or right or in other directions to capture images of a different perspective. Programmable controls 450 allow the system implementer to customize operation of the system for various uses. For example, a Button A can be programmed to capture a still image, while a Button B can be programmed to switch to an infrared mode to display heat sources. The display 410 allows the operator to see the data that the portable platform is capturing while also controlling the portable platform through maneuvers.

In some embodiments, the portable measurement system provides a custom software application for a smartphone or other mobile computing device that provides control of the portable platform while at a job site. The software application may customize existing open source tools for providing control information to remote control vehicles or may provide a proprietary implementation. The application may provide a multi-channel (e.g., 12 channels) controller with digital inputs and outputs, programmable functions, and failsafes that can be setup to control a variety of types of remote control vehicles. Although quadcopters and roofing have been used as examples herein, the system can also be used in many other common construction situations, such as roving vehicles for underground repairs, vehicles that can travel inside ventilations systems, ductwork, pipes, sewage systems, tunnels, and other locations where placing personnel would be expensive, time-consuming, and/or potentially hazardous. The application can perform end point adjustment, trimming, channel mixing, value mixing, linear and exponential adjustments, and other standard adjustments of radio controllers.

In some embodiments, the portable measurement system provides actions in addition to data capture. For example, the system may include an arm or other controllable part that can move objects, repair damage, place a temporary protective layer over a damaged area, and so on. These actions can be used to move debris to better assess damage, to carry out repairs, and to secure an area until repairs can take place (e.g., placing a tarp on a leaking roof).

In some embodiments, the portable measurement system provides software as a service (SaaS) microsites branded for particular entities. Third parties may want to use the estimation services described herein for delivering their own construction or other services. In such cases, the system can provide a website branded for the particular third party (e.g., a microsite), that provides the functions described herein, such as receiving estimate orders, dispatching portable platform operators, capturing measurement data, processing measurement data to produce estimates, and communicating estimates to customers. The system may allow various customizations such as branding (e.g., placing logos or other images on the site), determining how estimate costs are calculated, accounting for regional and jurisdictional differences, and so forth.

In some embodiments, the portable measurement system includes a set of glasses that operate as a controller for the portable platform. GOOGLE™ and others have described glasses that are capable of interacting with a computing device to operate the computing device and receive information. The system can leverage such glasses to provide a head-up display (HUD) to an operator of the portable platform, as well as to allow the operator to look at what the vehicle is doing rather than down at a smartphone or other controller. The operator may also operate the platform through the glasses by eye movements or other detectable motions.

In some embodiments, the portable measurement system interfaces with third party systems to provide or receive data related to preparing estimates. For example, the system may interface with the XACTIMATE™ and SYMBILITY™ software that is popular in the insurance industry for providing repair estimates, roofing geometric calculation software, and other software for providing estimates. The system may also access regional databases that include labor and material costs, tax information, or other data that can affect the accuracy of estimates so that the system can incorporate such information in the estimate process. The system may also include one or more application programming interfaces (APIs) or web services that allow other software to programmatically interact with the system. This allows third party developers to extend the system or to incorporate the system into their own comprehensive solutions.

In some embodiments, the portable measurement system receives a payment from a homeowner, contractor, or third party for preparing an estimate report as described herein. The system may offer a per-estimate fee, subscription based services (e.g., 500 reports a month for a flat fee), or other payment plans in exchange for the work described herein.

In some embodiments, the design of the portable platform used by the portable measurement system is constructed to increase safety and or durability of the platform. For example, the blades of a helicopter-based platform may include a round disk around the edges to prevent any injury if the helicopter were to come into contact with a person (e.g., due to poor flight control, loss of power, and so forth). As another example, the circuitry and other components of the platform may be encased in foam and/or silicone to provide shock resistances and waterproofing. The conditions under which the platform is used may be harsh, and the care taken with the platform may not be ideal, and the vehicle can be designed in ways that increase its durability under common operating conditions.

From the foregoing, it will be appreciated that specific embodiments of the portable measurement system have been described herein for purposes of illustration, but that various modifications may be made without deviating from the spirit and scope of the invention. Accordingly, the invention is not limited except as by the appended claims.

I claim:

1. A computer-implemented method to operate a portable platform to capture information for preparing a work estimate, the method comprising:
receiving a request to prepare an estimate for a particular construction task at a specified location;
in response to receiving the request, dispatching to the specified location an instance of a portable flying platform that is an unmanned remote controlled vehicle capable of maneuvering around the specified location to capture measurement data for preparing the requested estimate, wherein the portable flying platform flies at low altitude less than 400 feet off of the ground;
controlling the portable platform through maneuvers at the received location;
capturing measurement data at the specified location using one or more sensors mounted to the portable platform, wherein the measurement data includes automatically determining pitch of a roof at the specified location from the flying platform without physical contact with the roof and identifying one or more roof penetrations;
analyzing the captured measurement data to process the captured measurement data into information actionable for preparing an estimate for the particular construction task at the specified location; and
automatically generating an estimate for the construction task at the specified location and delivering the estimate to a user,
wherein the preceding steps are performed by at least one processor.

2. The method of claim 1 wherein receiving the request to prepare the estimate comprises receiving a request from a homeowner or contractor through a website that includes an interface for submitting orders for estimates for particular types of construction work.

3. The method of claim 1 wherein receiving the request to prepare the estimate comprises receiving a street address, client name, or other identification of a proposed job site so that an operator can be dispatched to the location to use the portable platform to capture measurement data.

4. The method of claim 1 wherein dispatching the instance of the portable platform comprises delivering the vehicle by preparing shipping information for a worker to ship the portable platform to a recipient.

5. The method of claim 1 wherein dispatching the instance of the portable platform comprises sending an instruction to an operator to personally take the portable platform to the specified location.

6. The method of claim 1 wherein controlling the platform through maneuvers comprises specifying a flight path that carries the vehicle to points around the specified location where one or more sensors of the portable platform can capture data related to preparing the requested estimate.

7. The method of claim 1 wherein controlling the platform through maneuvers comprises receiving input from a controller operated by an operator.

8. The method of claim 7 wherein the controller comprises a smartphone running a software application that uses communication hardware of the smartphone to communicate with the portable platform.

9. The method of claim 1 wherein controlling the platform through maneuvers comprises control of the portable platform automatically using a preset flight plan or sensor-based navigation on the vehicle itself.

10. The method of claim 1 wherein controlling the platform through maneuvers comprises receiving remote control instructions from an operator in a remote datacenter connected to the portable platform via a network.

11. The method of claim 1 wherein capturing measurement data comprises capturing at least one of data selected from the group consisting of photos, distance measurements, and angular measurements.

12. The method of claim 1 wherein capturing measurement data comprises capturing measurement data from a perspective not obtainable from the ground, and that keeps the operator safe by traveling to perspectives of the job site that would normally be unavailable without the operator getting on a ladder, roof, or other hazardous location.

13. The method of claim 1 wherein capturing measurement data comprises capturing measurement data that is more up-to-date and high resolution than that available from previously taken satellite imagery or high altitude flyovers of the job site.

14. The method of claim 1 wherein analyzing the captured data comprises recognizing objects in a captured image to identify obstructions that increase the cost of the construction task.

15. The method of claim 1 wherein generating and delivering the estimate comprises determining an estimate of cost of labor and materials of the task using regional cost information based on the specified location.

16. A computer system for remote measurement via an on-site portable platform, the system comprising:
a portable flying platform that is a remote controlled physical device that is delivered in response to an estimate request on-site to a potential job site to maneuver around the job site to capture measurement data for estimating a cost of a task to be performed at the job site, wherein the portable flying platform flies at low altitude less than 400 feet off of the ground;
a measurement capture component that includes one or more sensors attached to the portable platform for capturing measurement data at the job site;
a platform control component that controls the operation of the portable platform to direct the portable platform through a particular navigation path and the operation of the measurement capture component to capture measurement data;
a control communication component that includes hardware and software for establishing a link between the portable platform and platform control component and subsequently communicating control instructions;
a data communication component that includes hardware and software for establishing a link between the measurement capture component and the measurement analysis component;
a measurement analysis component that processes measurement data captured at the job site to identify one or more characteristics of the job site and elements in the data that affect pricing of the task to be performed, wherein processing the measurement data includes automatically determining pitch of a roof at the job site from the portable flying platform without physical contact with the roof and identifying one or more roof penetrations; and
an estimate delivery component that automatically generates an estimate for the cost of the task to be performed at the job site from the measurement analysis and delivers the estimate to a user of the system.

17. The system of claim 16 wherein the portable platform is a remote controlled helicopter or other flying device that includes sensors for capturing data and control input for managing a flight path.

18. The system of claim 16 wherein the measurement capture component includes a camera for capturing images and video a storage device for storing captured measurement data, and a data communication link for transferring stored data to a processing center.

19. A non-transitory computer-readable storage device comprising instructions for controlling a computer system to receive control information for a remote controlled portable flying platform from a mobile device, wherein the instructions, upon execution, cause a processor to perform actions comprising:
establishing a communication link between the portable flying platform and the mobile device;
displaying a control user interface on the mobile device that includes flight controls for the portable flying platform;
receiving control instructions from a user that interacts with the mobile device to control the portable flying platform to capture measurement data at a potential job site, wherein the portable flying platform is delivered to the potential job site in response to receiving an estimate request for work at the potential job site, wherein the portable flying platform flies at low altitude less than 400 feet off of the ground, and wherein the measurement data includes automatically determining pitch of a roof at the specified location from the portable flying platform without physical contact with the roof and identifying one or more roof penetrations;
guiding the portable flying platform based on the received control instructions;
receiving visual data captured by the portable platform and displaying the captured visual data on the mobile device; and
automatically generating an estimate for the work at the potential job site.

20. The device of claim 19 wherein the mobile device includes a smartphone or other computing device that runs a software application selected by the operator for controlling the portable flying platform.

* * * * *